United States Patent [19]

Jecevicus

[11] Patent Number: 4,831,764
[45] Date of Patent: May 23, 1989

[54] TOP WATER FISHING LURE

[76] Inventor: Anthony S. Jecevicus, P.O. Box 34, Big Falls, Wis. 54926

[21] Appl. No.: 207,383

[22] Filed: Jun. 15, 1988

[51] Int. Cl.$^4$ ............................................. A01K 85/00
[52] U.S. Cl. .................................. 43/42.25; 43/42.26; 43/42.34; 43/42.45; 43/42.53
[58] Field of Search ................. 43/42.26, 42.25, 42.34, 43/42.45, 42.48, 42.53, 42.27, 42.32

[56] References Cited

U.S. PATENT DOCUMENTS

| | | | |
|---|---|---|---|
| 885,861 | 4/1908 | Pepper | 43/42.26 |
| 2,571,980 | 10/1951 | Weigandt | 43/42.26 |
| 2,891,343 | 6/1959 | Palermo | 43/42.26 |
| 3,590,514 | 7/1971 | Begley | 43/42.53 |
| 3,877,168 | 4/1975 | Stevens | 43/42.34 |
| 4,414,772 | 11/1983 | Duncan | 43/42.45 |

OTHER PUBLICATIONS

Bass Pro Shops 1986 Catalog, p. 187, "Creek Chub Injured Minnow".

Primary Examiner—Nicholas P. Godici
Assistant Examiner—William S. Andes
Attorney, Agent, or Firm—Fuller, Puerner & Hohenfeldt

[57] ABSTRACT

A fishing lure constructed of a generally solid one-piece body, a plurality of strands of living rubber which together pass transversely through a single generally horizontal opening in the body, and a simulated eye attached to the bottom of the body, and a method of making the lure. The surface of the body is rough, and is finished with a high gloss finish so as to simulate the appearance of feathers or fur. The eye includes a single transparent domed enclosure attached to the bottom surface of the body, and a loose ball enclosed therein. In the method, a solid block of wood is shaped into an elongated shape of a desired lure, and apertures are formed in the block for the attachment of hooks and a line, including at least one transverse hole entirely through the body. A simulated eye is attached to the bottom of the body. Next the body is finished with a high gloss finish. Then a length of pre-slitted living rubber is inserted through the transverse hole, so that some of the rubber protrudes outside of the body at each end of the hole. Finally, hooks and a screw eye for line attachment purposes are connected to the body so as to cause the eye to remain on the bottom side of the body.

14 Claims, 1 Drawing Sheet

TOP WATER FISHING LURE

BACKGROUND OF THE INVENTION

This invention relates to a fishing lure that is used at the water's surface, and in particular to such a lure which has a particularly life-like appearance when in use.

It is probably an understatement to state that there are a large number of fishing lures available, of a number of different types, all having the object of presenting a life-like appearance. There are also a number of lures that are of the type having a solid body with flexible members attached to the outside of the body. Alternatively, as in the case of certain types of flies, the flexible members actually form part of the body of the lure.

A few lures even have flexible members protruding from the body. For instance, Weigandt, U.S. Pat. No. 2,571,980, discloses a lure formed in two facing sections, with bundles of bristles or hairs positioned in transverse grooves and held therein by the assembling of the sections together. Other than stating that they are bristles or hairs, no further description of the material of which they are constructed is given. As another example, Palermo, U.S. Pat. No. 2,891,343, shows a number of strands projecting out from both sides of the lure there disclosed. These strands are alternatively referred to as bucktail hairs, whiskers and vibratory wings. They are attached by connecting them to a set of legs within the body. Both of these patents require several manufacturing steps to install these projections, making manufacturing of these lures relatively expensive. Further, the projections themselves are quite stiff, allowing for comparatively little movement in the water, reducing the life-like effect of the appearance. Most often the flexible members are attached to the hook, rather than associated directly with the body itself.

The Stevens patent, U.S. Pat. No. 3,877,168, shows a lure having a pair of simulated eyes, one disposed on each side of the body. These eyes are mainly included to add a certain noise to the lure as it is played through the water, rather than for appearance purposes.

The invention relates to improvements to the apparatus described above and to solutions to the problems raised thereby.

SUMMARY OF THE INVENTION

This invention relates to a fishing lure which is constructed of a generally solid one-piece body, a plurality of strands of living rubber which together pass transversely through a single generally horizontal opening in the body, and simulated eye means attached to one side of the body. Since the lure is designed to be a top water bait, the body is buoyant, and fish hooks are attached to the body so as to cause the side of the body to which the eye means is attached to be the bottom of the body. The surface of the body is rough, and is finished with a high gloss finish so as to simulate the appearance of wet feathers or fur. The eye means includes a single transparent domed enclosure attached to the bottom surface of the body, and a loose ball enclosed within the enclosure.

The invention also includes a method of making the above fishing lure, wherein a solid block of wood is provided. The block is shaped into an elongated shape of a desired lure, and apertures are formed in the block for the attachment of hooks and a line, including at least one transverse hole entirely through the body. An eye is attached to the body, and comprises a single transparent domed enclosure attached to the body and a loose ball, contrasting in color to a background within the enclosure, enclosed within the enclosure. Next the body is finished with a high gloss finish. Then a length of pre-slitted living rubber is inserted through the transverse hole, so that some of the rubber protrudes outside of the body at each end of the hole. Finally, then, hooks and a line attachment means are connected to the body so as to cause the eye to be on the bottom side of the body. The block of wood is either basswood or cedar, and is selected when still green. The roughened appearance achieved by working with woodworking tools on green wood, in combination with the dipping in latex or other water based paint or stain and the high gloss finish, gives a very realistic appearance of wet feathers or fur. In order to insert the pre-slitted rubber into the body, an open-eye needle is passed through the transverse hole. One end of pre-slitted rubber of indeterminately long length is laid onto the eye of the needle, and the needle is pulled back out of the transverse hole. The rubber is then cut off so that some of the rubber protrudes out each end of the hole. The pre-slitted rubber may then be manually pulled after insertion to separate the pre-slitted portions.

Other objects and advantages of the invention will become apparent hereinafter.

DESCRIPTION OF THE PREFERRED EMBODIMENTS

Figure 1:
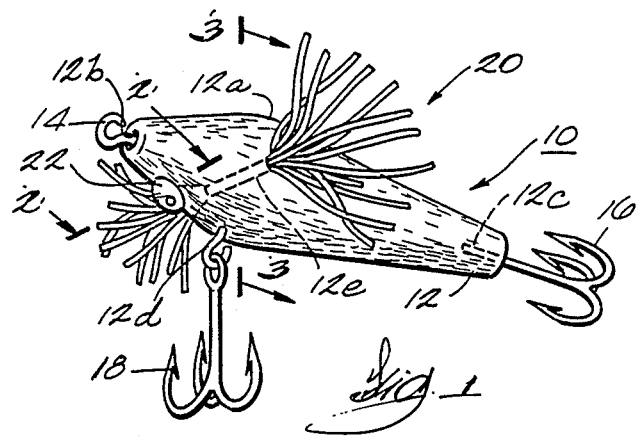
FIG. 1 is an isometric view of a fishing lure constructed according to a preferred embodiment of the invention.

Referring now to FIG. 1, there is shown a fishing lure 10 constructed according to one embodiment of the invention. As shown there, the lure 10 includes a one piece body 12, formed in the shape of a desired bait. The body 12 may be manufactured of any suitable buoyant material such as plastic, but preferably the body is made of wood and in particular either cedar or basswood. The selected wood is processed green, so that the working of the woodworking tools begins to produce the roughened exterior appearance as shown in FIG. 1.

To make the lure 10, a block of the selected wood is first formed generally into the lure shape of the body as shown in FIG. 1. Any desired shape may be used. The shape shown in FIG. 1 is a commonly used shape which, depending upon the type of fish intended to be caught, can be configured as a bird, a fish, a mud puppy and so on. The most preferred shape is elongated, having a smoothly varying diameter with the largest diameter being about a third of the way from the front to the back, at a point designated 12a. This shape is attained in any suitable manner, such as by use of a lathe. As stated above, the use of a lathe or other woodworking tool on the green wood as required above results in a certain amount of roughening.

Once the desired shape is attained, apertures or holes are formed therein for attachment of the various added features, preferably by drilling. In particular, a front hole 12b is formed in the front end of the body 12 for installation of a line attachment means such as a screw eye 14, to allow the attachment of a fishing line (not shown) to enable use of the lure 10. A rear hole 12c may be formed at the rear end of the body 12 for installation of a rear hook 16. A bottom hole 12d is formed at the bottom of the body 12 for installation of a bottom hook 18. A transverse hole 12e is formed entirely through the body 12, generally perpendicularly to the longitudinal axis of the body, and also perpendicuarly to the bottom hole 12d, and allowing later installation of a strip 20 of pre-slitted rubber, by a method to be described below.

Once these holes are made in the body 12, the next step is to strain or otherwise color the body by the application of staining material. In the preferred embodiment, the body 12 is dipped into a paint, such as a latex enamel paint or other water based paint. The body 12 is dipped in order that complete coverage is easliy obtained. The water based staining material is used because it causes expansion of the roughness created in the forming step above by use of woodworking tools on the green wood.

Figure 2:
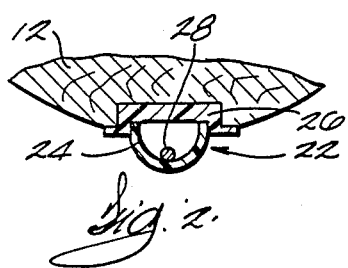
FIG. 2 is a fragmentary cross sectional view of the fishing lure shown in FIG. 1, taken generally along line 2—2 thereof.

Next, a simulated eye 22 is attached to the body 12. It is important that the eye 22 be attached to the bottom surface of the body 12. The lure 10 is intended as a top water bait, and most of the fish toward which it is directed will be seeing it from the bottom. There are many baits which have an eye on each side, but in a top water bait a number of side mounted eyes will not be as effective as a single eye on the bottom, because they will not be seen as much. As shown in more detail in FIG. 2, the eye 22 includes a single transparent domed enclosure 24 attached to a mounting piece 26 which constitutes a background, and which is attached to the body 12. Trapped between the enclosure 24 and the mounting piece 26 is a loose ball 28, which acts as a "pupil" within the simulated eye 22, moving freely with the force of gravity, with the movements of the lure 10 as the water moves it, and as the fisherman moves it with the line. The ball 28 is of a color that contrasts with the color of the mounting piece 26 so as to make it more visible. This type of eye, particularly positioned on the bottom of the body 12, gives the appearance of fear, which is uniquely attractive to predator fish.

Thereafer, the body 12 is a further finished by the application of a high gloss finish. In the preferred embodiment, such a high gloss finish is provided by dipping the body in lacquer, for at least three coats, being sure to dry fully between coats so as to avoid the formation of bubbles in the finish. The dipping application of lacquer causes the roughness from the forming step, expanded in the staining step, to become hardened in its rough condition. In combination with this roughness, the application of a high gloss finish to the body results in an appearance in the water very similar to wet feathers or wet fur, or even scales.

Figure 3:
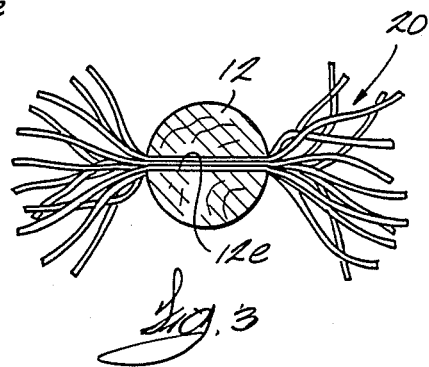
FIG. 3 is a cross sectional view of the fishing lure shown in FIG. 1, taken generally along line 3—3 thereof.
Figure 4:
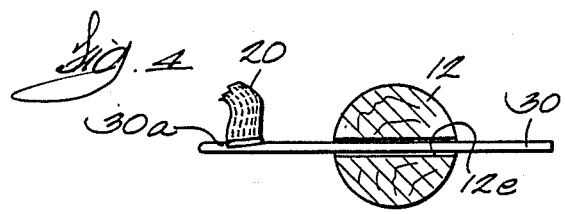
FIG. 4 is a cross sectional view similar to FIG. 3, showing the needle method of insertion of the rubber strip.

The final step in construction of the lure 10 is insertion of the strip 20 of rubber which gives the appearance of fins, wings or legs on the lure of FIG. 1. As shown in FIG. 3, this strip 20 of rubber is inserted all the way through the transverse hole 12e of body 12, and held therein merely by friction. Since rubber is highly elastic, it can be compressed by the insertion operation, and will hold itself within the hole 12e by friction alone. The preferred method of insertion is shown in FIG. 4. As there shown, an open-eye needle 30 is first inserted through the transverse hole 12e in the body 12. The needle 30 may be held by hand or may be affixed to some fixture (not shown) and the body 12 slid thereon. Since the eye 30a of the needle 30 is open, the end of a pre-slitted strip 20 of rubber of indeterminate length may be merely laid across the needle, and when the needle is drawn back through the hole, or the body 12 pulled off the needle, the strip is carried with the needle. Of course the relative size of the hole 12e and the strip 20 must be close enough that a frictional fit is attained. In order to enhance the frictional fit of the strip 20 in the hole 12e, the strip may be stretched prior to pulling it through the hole, effectively reducing the diameter or size of the strip temporarily. This allows a thicker strip 20, in effect more of the rubber, to be installed in the body 12, providng a better friction fit. The strip 20 is pulled through the hole 12e until the desired length thereof extends on the other side of the body 12. Then the strip 20 is cut off transversely at a distance to allow about the same length projecting out of each side of the body 12. Thereafter, the pre-slitted rubber strip 20 may be separated into a number of smaller strips as shown in FIG. 1, merely by pulling on the strip. The strip 20 is sufficiently elastic that pulling on the strip separates it along the slits.

The rubber strip 20 is also field replaceable, such as by a fisherman user, in case the rubber should become torn, worn or bitten off, for instance. If a fisherman does not have an open-eye needle 30 available, the use of which is described above, he could, after removing the old rubber, slip a closed loop of fishing line through the hole 12e, hook one end of the loop to a stationary object, loop a new rubber strip 20 through the loop of fishing line and pull in the new rubber strip, after stretching the rubber strip so as to make it temporarily smaller as described above. Pre-sized lengths of rubber strips 20 could be supplied for this purpose.

Figure 5:
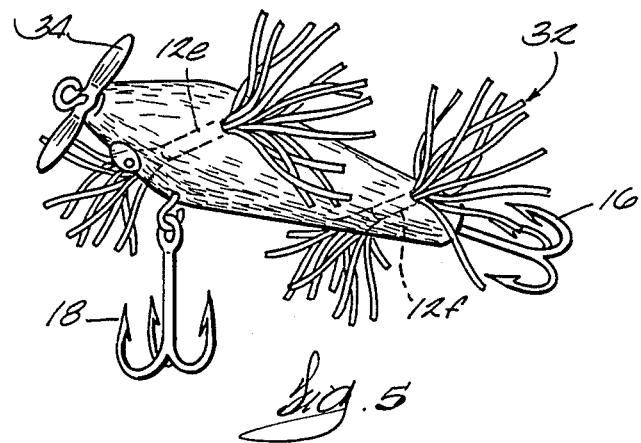
FIG. 5 is an isometric view of a fishing lure constructed according to a different preferred embodiment of the invention.

Of course, different embodiments are also included in the invention. The embodiment shown in FIG. 1 is of a bird. For instance, another embodiment could be formed similar to a mud puppy, as shown in FIG. 5. In that embodiment, second transverse hole 12f is drilled all the way through the body 12, spaced apart from but generally parallel to the first such hole 12e. Another strip 32 may be inserted in the hole 12f by the same method as set forth above with respect to hole 12e and strip 20. Further, a propeller 34 could be added, such as to the line attachment screw eye 14. The propeller 34 can be mounted to allow rotational movement, or it can be rigidly mounted to cause turbulence merely by being pulled through the water by the fisherman.

While the apparatus hereinbefore described is effectively adapted to fulfill the aforesaid objects, it is to be understood that the invention is not intended to be limited to the specific preferred embodiment of top water fishing lure set forth above. Rather, it is to be taken as including all reasonable equivalents within the scope of the following claims.

I claim:

1. A fishing lure comprising:
   a buoyant, elongated, generally solid onepiece body;

a plurality of strands of living rubber which together pass transversely through a single generally horizontal opening in said body;

a single simulated eye means attached to one side of said body; and fish hooks attached to said body so as to cause the side of said body to which said eye means is attached to be the bottom of said body.

2. A fishing lure as recited in claim 1 wherein the surface of said body is rough, and is finished with a high gloss finish so as to simulate the appearance of wet feathers or fur.

3. A fishing lure as recited in claim 1 wherein said body is formed of wood, its surface being rough and finished with a high gloss finish so as to simulate the appearance of wet feathers or fur.

4. A fishing lure as recited in claim 1 wherein said eye means includes a single transparent domed enclosure attached to the bottom surface of said body, and a loose ball enclosed within said enclosure.

5. A fishing lure as recited in claim 4 wherein said enclosure includes a background surface contrasting in color with said ball.

6. A fishing lure as recited in claim 1 wherein said eye means and at least one of said hooks are attached to the same side of said body.

7. A method of making a fishing lure, comprising the steps of:

providing a solid block of wood;

shaping said block into an elongated shape of a desired lure;

forming apertures in said block for the attachment of hooks and a line, including at least one transerse hole entirely through said body;

attaching an eye to said body, said eye comprising a single transparent domed enclosure attached to said body, a loose ball, contrasting in color to a background within said enclosure, enclosed within said enclosure;

finishing said body with a high gloss finish;

inserting pre-slitted living rubber through said transverse hole, so that some of said rubber protrudes outside of said body at each end of said hole;

attaching hooks and a line attachment means to said body so as to cause said eye to be on the bottom side of said body.

8. A method of making a fishing lure as recited in claim 7 wherein said block of wood is selected from a group consisting of basswood and cedar.

9. A method of making a fishing lure as recited in claim 7 wherein said block of wood is green wood as the process is begun.

10. A method of making a fishing lure as recited in claim 7 comprising the step of staining said body with latex enamel paint by dipping, before said step of attaching said eye.

11. A method of making a fishing lure as recited in claim 7 wherein the finishing step includes dipping said body in clear lacquer four times, drying fully between each dipping and after the last dipping.

12. A method of making a finishing lure as recited in claim 7 wherein said inserting step includes passing a needle through said transverse hole, inserting one end of pre-slitted rubber of indeterminately long enough into an eye of said needle, pulling said needle back out of said transerse hole, and cutting off said rubber so that some of said rubber protrudes out each end of said hole.

13. A method of making a fishing lure as recited in claim 12 wherein said needle is of the open-eye type, and wherein said rubber is laid across the needle before the needle is drawn back into the transverse hole, so that the needle pulls the rubber into and partially through the hole, leaving the rubber held in the hole merely by friction.

14. A method of making a fishing lure as recited in claim 7 further comprising manually pulling on the rubber after the inserting step to separate the pre-slitted portions.

* * * * *

UNITED STATES PATENT AND TRADEMARK OFFICE
CERTIFICATE OF CORRECTION

PATENT NO.   :   4,831,764
DATED        :   May 23, 1989
INVENTOR(S)  :   Anthony S. JECEVICUS It is certified that error appears in the above—identified patent and that said Letters Patent is hereby corrected as shown below:

Column 5, Line 34:   Delete "transerse" and substitute --- transverse ---

Column 5, Line 38:   Before "a" insert --- and ---

Column 6, Line 22:   Delete "finishing" and substitute --- fishing ---

Column 6, Line 25:   Delete "enough" and substitute --- length ---

Column 6, Line 27:   Delete "transerse" and substitute --- transverse ---

Signed and Sealed this

Twentieth Day of February, 1990

*Attest:*

JEFFREY M. SAMUELS

*Attesting Officer*     *Acting Commissioner of Patents and Trademarks*